Feb. 10, 1931. B. M. SHIPLEY 1,791,908
CASH REGISTER
Filed March 2, 1929 5 Sheets-Sheet 1

Inventor
Bernis M. Shipley
By
His Attorneys

Feb. 10, 1931.  B. M. SHIPLEY  1,791,908
CASH REGISTER
Filed March 2, 1929   5 Sheets-Sheet 2

Inventor
Bernis M. Shipley
By
His Attorneys

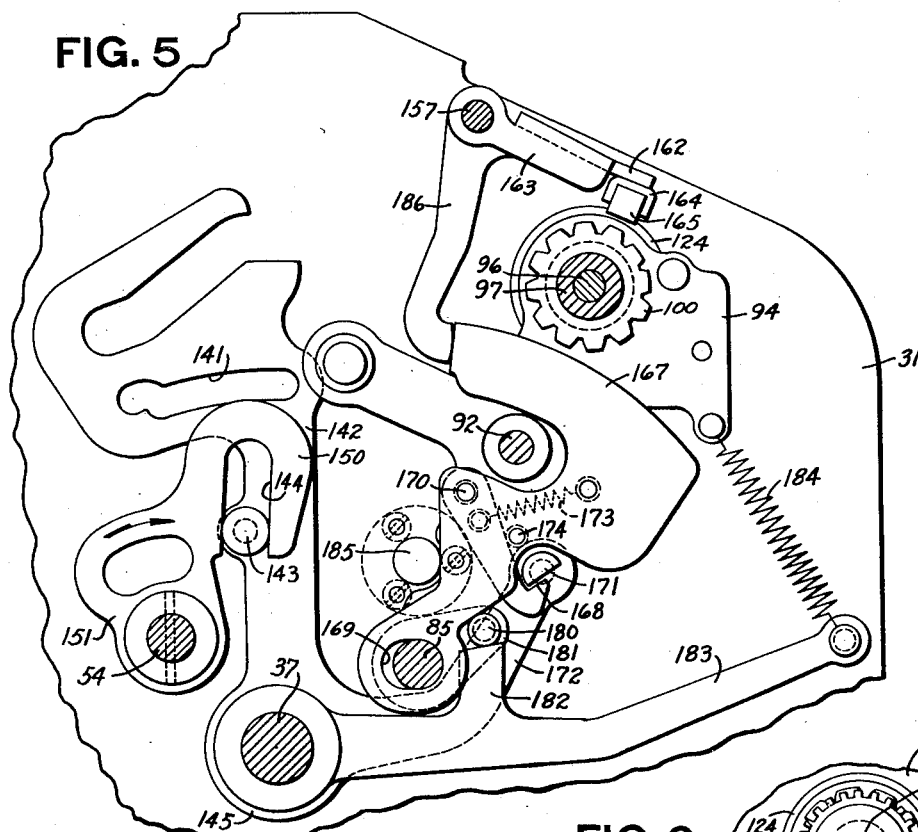

Feb. 10, 1931.   B. M. SHIPLEY   1,791,908
CASH REGISTER
Filed March 2, 1929    5 Sheets-Sheet 4
FIG. 7
FIG. 8
FIG. 9
FIG. 10
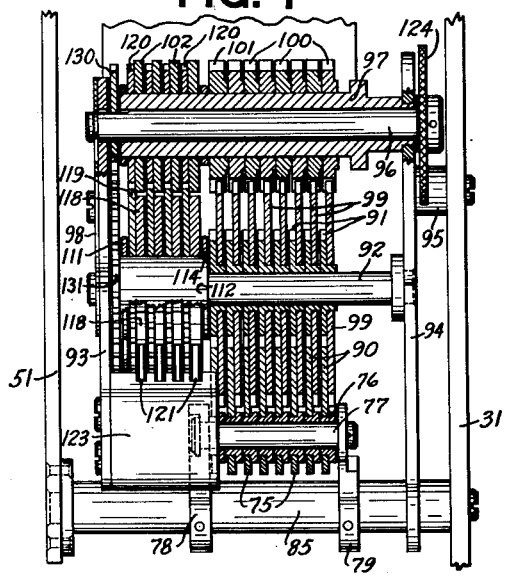
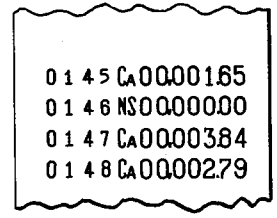
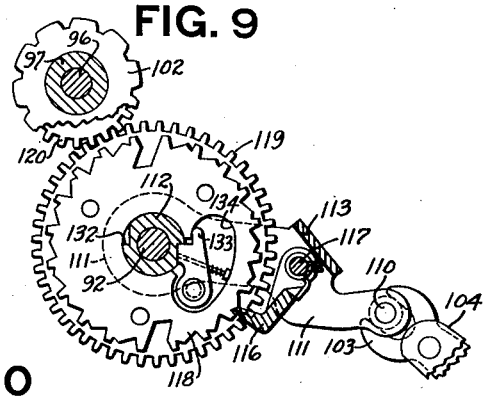
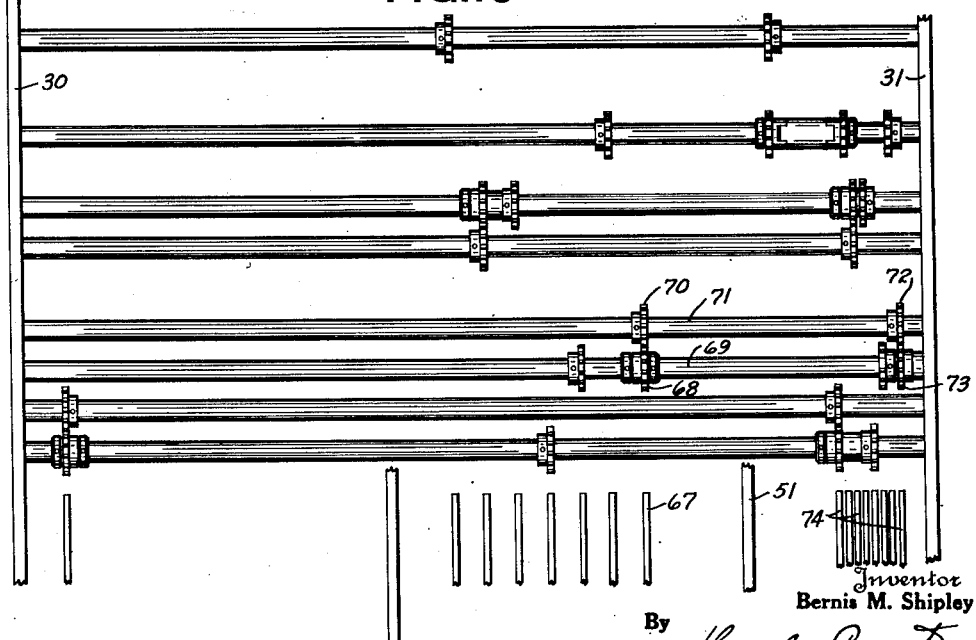
Inventor
Bernis M. Shipley
By
His Attorneys Patented Feb. 10, 1931

1,791,908

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Application filed March 2, 1929. Serial No. 344,077.

This invention relates to registers and like machines, and has more particularly reference to the printing mechanisms for such machines.

The printing mechanism of the present invention is adapted to be used in connection with key-operated or "press down" key types of registers generally, and, as illustrated in the accompanying drawings, is particularly well suited for use with machines of the type disclosed in applications for Letters Patent of the United States, Serial Nos. 261,996, and 334,482, filed March 15, 1928, and January 23, 1929, respectively, by B. M. Shipley.

Heretofore, in machines of this type, the printing mechanism protruded beyond the general outline of the cabinet or casing enclosing the machine. This was, at the same time, unsightly and costly in that it necessitated additional material and operations in the process of manufacture, and rendered the cabinet unsymmetrical. Also the space beneath the protruding printing mechanism offered a lodging place for dust and dirt.

One object of this invention is to provide a machine of the type disclosed, with a novel printing mechanism in such compact form that it does not project beyond the general outline of the machine casing.

Another object is to provide a machine of the type disclosed in the above-mentioned applications for Letters Patent, with a novel printing mechanism of unit construction, which shall be readily removable from and replaceable upon the machine.

Another object of the invention is to associate with such printing mechanism, a novel ink ribbon mechanism of unit construction which is readily removable from and replaceable upon the machine.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In the drawings:

Fig. 5 is an enlarged detail side view of the printing hammer and its operating mechanism.

Fig. 6 is an enlarged detail side view of the consecutive number type wheels and the mechanism for advancing them one step at each operation of the machine.

Fig. 7 is a sectional view looking towards the rear of the machine, showing the type wheels and gears for setting them.

Fig. 8 illustrates one form of detail record strip.

Fig. 9 is a fragmentary view, partly in section, of the consecutive number operating means.

Fig. 10 is a diagrammatic view of the segments and shafts for differentially setting the type wheels.

Fig. 14 is a detail sectional view showing the manner of releasably connecting the type setting segment to the link carrying the type wheel rack shown in Fig. 3.

General description

The preferred form of the present invention is illustrated herein as applied to a key-operated or "press down" key cash register, provided with a plurality of denominational groups or sets of keys. As in most machines of this type, depression of one or more amount keys operates the register to set indicators to display the amount of the transaction, adds the amount onto the totalizer, and operates the printing mechanism to print the amount of the transaction.

The present invention relates more particularly to the printing mechanism for which reason illustrations and descriptions of the indicating mechanism and of the totalizer are omitted from the drawings and specification comprising this application.

The printing mechanism which is one of the novel features of this invention, includes a group of amount type wheels, a transaction type wheel and a group of consecutive number type wheels mounted in axial alignment in the machine to the right of the differential mechanism. A unitary paper web frame carries a supply roll and a receiving roll of detail paper, and is removably supported in the machine in such a manner that the detail record strip passes around an impression hammer, also supported on the removable detail strip frame, and between said hammers and type wheels. A novel mechanism is provided to operate the hammer to take the impression.

A unitary ink ribbon frame carrying a suitable ink ribbon, is removably mounted in the machine just beneath the removable paper frame, and is demountable after the detail paper frame is removed from the machine, for the purpose of replacing the worn ribbon with a fresh one. A novel mechanism is provided to feed the ink ribbon and to reverse the direction of feed.

A plurality of groups of amount and transaction keys are provided to set the amount and transaction type wheels. Minimum movement devices, under control of their respective groups of keys, set the type wheels from the positions in which they were left at the last operation of the machine to the new positions corresponding to the keys depressed. Also mechanism is provided to advance the consecutive number device one step of movement at each operation of the machine.

The minimum movement devices are also utilized to set indicators, not shown, directly to their new positions, such indicators being fully disclosed in the above-mentioned co-pending application, Serial No. 261,996.

Frame

The main body of the machine is supported between two side frames 30 and 31 (Fig. 9), secured to the opposite sides of a sub-base 32 (Fig. 1), which, in turn, is supported on a framework 33 forming a closure to suitably accommodate a cash drawer, not shown herein, it having no bearing on the present invention.

Figure 1:
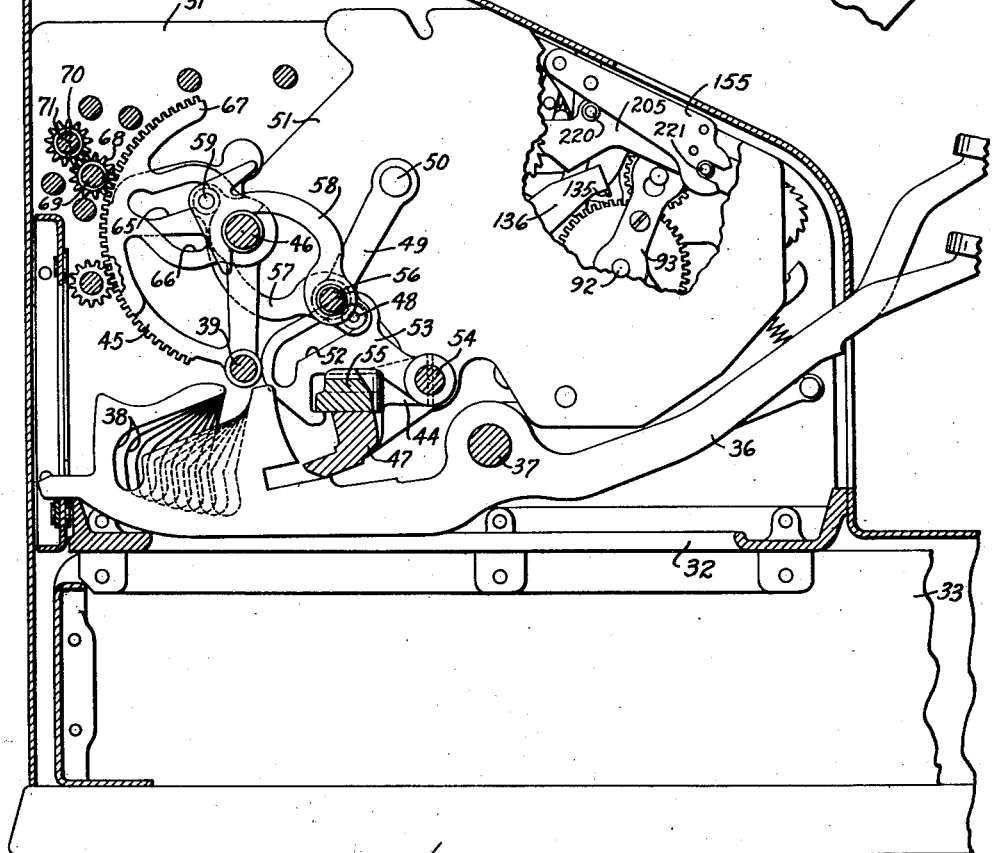
Fig. 1 is a transverse sectional view taken through the machine, showing one of the groups of amount keys and the differential mechanism associated therewith. The side frame between the differential mechanism and the printing mechanism is broken away to show a part of the latter mechanism.

A cabinet or casing 34 encloses the mechanism of the machine, the cabinet being dome-shaped at the top to form a suitable closure for indicators (not shown). The framework 33 and the cabinet 34 rest on a base 35 (Fig. 1).

Amount keys

The full complement of the keyboard of the machine selected to illustrate the present invention includes a plurality of denominational banks or groups of amount keys 36 (Fig. 1), a "total" key and a "no-sale" key, neither of which are shown, since they have no bearing on the present invention.

As the corresponding keys of each of the denominational groups of amount keys are alike, but one group of keys will be described.

The keys 36, illustrated in Fig. 1, are the "cents" keys, all of which are journaled intermediate their ends on a universal rod 37 extending between and supported in the machine side frames 30 and 31. The rear arm of each of the keys 36 is provided with a differential cam slot 38 open at one end and adapted to co-operate with a universal bail 39 carried by and extending between a pair of differential segments 45, only one of which is shown, pivoted on a cross-rod 46 supported by the side frames 30 and 31. Depression of a key 36 engages the mouth of its slot 38 with the universal bail 39, and continued depression of the key rocks the bail 39 and segment 45 clockwise, as viewed in Fig. 1, a distance corresponding to the value of the key 36 depressed.

Depression of a key 36 also rocks a key coupler 47 in clockwise direction, the key coupler being journaled on spindles (not shown) projecting inwardly from the side frames 30 and 31. The limit of the clockwise movement of the coupler is reached when the key reaches its limit of downward travel, whereupon the operator releases the key and the weight of the key coupler 47 rocks the key counter-clockwise to restore it to its normal undepressed position. The key, on its restoring movement, causes its cam 38 to also rock the differential frame comprised of the segments 45 and bail 39 counter-clockwise to normal position.

A minimum movement device for each denomination is incorporated in the machine, in connection with which, the present invention is illustrated. This minimum movement mechanism is operated by depression of a key, through the medium of the key coupler 47, to adjust the indicators (not shown) and the type wheels, to be described later, to their new positions corresponding to the values of the key or keys depressed.

The minimum movement is effected as follows:

A bar 55 (Fig. 1) mounted on top of and extending along the transverse key coupler 47, carries a pair of brackets 44, the forwardly extending ends of which support a shaft 54 in axial alignment with the pivotal points of the main key coupler 47. Obviously, as the key coupler rocks about its pivot, it will rock the shaft 54 likewise.

Spaced cam plates 53 fast on the shaft 54 extend rearwardly over the top of the bar 55 and are formed with hooks to take under the rear overhanging edge of the bar 55, so that the key coupler 47, bar 55, cam plates 53 and shaft 54, rock when one or more keys are depressed.

Each cam plate 53 has a cam slot 52 formed therein to accommodate a stud 48 carried on the free end of an arm 49 pivoted at 50 to an adjacent partition plate 51, one only of which is shown, there being two such arms 49.

The arm 49 and its companion arm (not shown), exactly like arm 49, support a universal rod 56 between them, on which are mounted a plurality of pairs of companion links 57 and 58, one pair for each denominational group of keys. The companion links 57 and 58 of each pair, are oppositely bowed to form an opening surrounding the crossrod 46.

The rear overlapping free ends of each pair of companion links 57 and 58 embrace their corresponding differential segment 45 and a toothed minimum movement segment 67 pivoted on the cross rod 46. A stud 59 rigidly connects the two rear overlapping ends of the companion links, such stud projecting through a cam slot 65 formed in the interposed differential segment 45 and through a heart-shaped opening 66 formed in the corresponding minimum movement segment 67.

As described above, depression of a key 36 rocks its differential segment 45 clockwise a distance corresponding to the value of the particular key depressed. At the same time, the key 36 rocks the key coupler 47, bar 55 and the cam plates 53 also clockwise. On this movement, the cam plates 53, through their cam slots 52, rock the arms 49 clockwise, and through the companion links 57 and 58, move the studs 59 outwardly in the slots 65 in the differential segments 45, and in the openings 66 in the minimum movement segments 67. Since the positions of the slots 65 in the differential segments 45 are controlled by the particular keys 36 depressed, the studs 59, on their outward movement, follow the contours of the cam slots 65 in the differential segments 45 and adjust the minimum movement segments 67 accordingly to positions corresponding to the values of the particular keys 36 depressed.

When no key is depressed in any particular denominational group, the corresponding differential segment 45 remains in its normal or home position, and the stud 59 of its companion links 57 and 58 will be forced to traverse a fixed path determined by the shape of the cam slot 65 in such stationarily-held segment, the companion links 57 and 58 rocking on their universal rod 56 to enable the stud to follow such contour, the opening formed between the bowed companion links permitting such movement of the links relatively to the cross rod 46.

And the stud 59, in traversing the cam slot 65 of such stationarily-held differential segment 45, will contact the wall of the heart-shaped opening 66 in the corresponding minimum movement segment 67 to restore the latter to its home or "zero" position, if it is not already in such position.

When pressure is removed from the key 36, the key coupler 47 and bar 55 restore to their normal position, rocking the actuated differential segment 45 counter-clockwise, and at the same time, returning all the companion links 57 and 58 to their home positions, which draws the studs 59 towards the cross rod 46. As the actuated differential segment 45 rocks counter-clockwise, its stud 59 moves idly in the large heart-shaped opening 66 in segment 67, wherefore this segment is not restored, but remains in the position to which it was adjusted on the depression of the key.

Should another key 36 in the same denominational group be depressed on the next operation of the machine, the setting stud 59, on its outward thrust, as guided by the contour of the slot 65 in the corresponding differential segment 45, would contact one wall or the other of the heart-shaped opening 66 in the minimum movement segment 67, depending upon whether the key last depressed was of higher or lower value than the previously depressed key, to adjust the minimum movement segment directly from its former adjusted position to its new position, without returning it to the normal or home position.

The minimum movement segment 67, shown in Fig. 1, meshes with a pinion 68 (Figs. 1 and 10 journaled on a shaft 69 supported in the side frames 30 and 31, which shaft is one of an inner arcuate group of such shafts arranged about the peripheries of the several denominational minimum movement segments 67. Pinion 68, in turn, meshes with a pinion 70 fast on a shaft 71 also supported in the side frames 30 and 31. The shaft 71 is one of an outer group of shafts arranged about the denominational segments 67 outside of and concentric with the inner group of shafts 69.

A pinion 72 (Figs. 3 and 10) fast on the shaft 71, near the side frame 31 (Fig. 10) meshes with a pinion 73 journaled on shaft 68. This pinion meshes with a segment 74 (Figs. 3 and 10) journaled on the cross rod 46. Through this train of gears and shafts, the movement of the minimum movement segment 67, imparted thereto by depression of an amount key 36, as described above, is transmitted to its corresponding type carrier controlling segment 74 to set this segment.

There is a train of gears and a type carrier controlling segment 74 for the minimum movement segment 67 of each denominational group of keys 36, certain of the minimum movement segments being directly connected through a pinion 68, shaft 69 and pinion 73 with their corresponding type carrier control segments 74. Links 75 (Fig. 3) pivotally connected at their rear ends to the respective type carrier controlling segments 74, extend forwardly and are slotted at their forward ends to embrace rollers 76 journaled on a cross rod 77 (see also Fig. 7), supported between the spaced arms 78 and 79, fast on a rod 85, mounted in the machine side frame 31 and the intermediate frame 51. The links 75 are removably pivoted on studs 86 in the type carrier controlling segments 74 and the flanged edges of studs 87 on the respective segments 74, take over concentric edges formed on the corresponding links 75 to normally hold the links on their respective studs 86, from which the links may be easily removed, however, by rotating them counter-clockwise about their studs to bring recesses 88 on the links into register with the studs 87. An extension 89 projects rearwardly from each of the links 75 to guide the links as they operate between the type carrier controlling segments 74, which are assembled in compact arrangement (see Fig. 10) on the cross rod 46.

Figure 3:
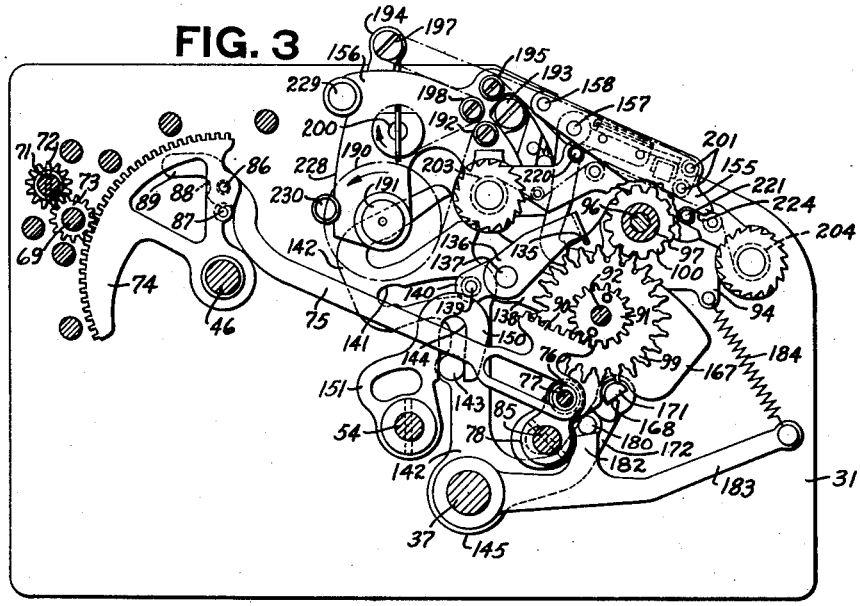
Fig. 3 is a view in left elevation of the printing mechanism.
Figure 4:
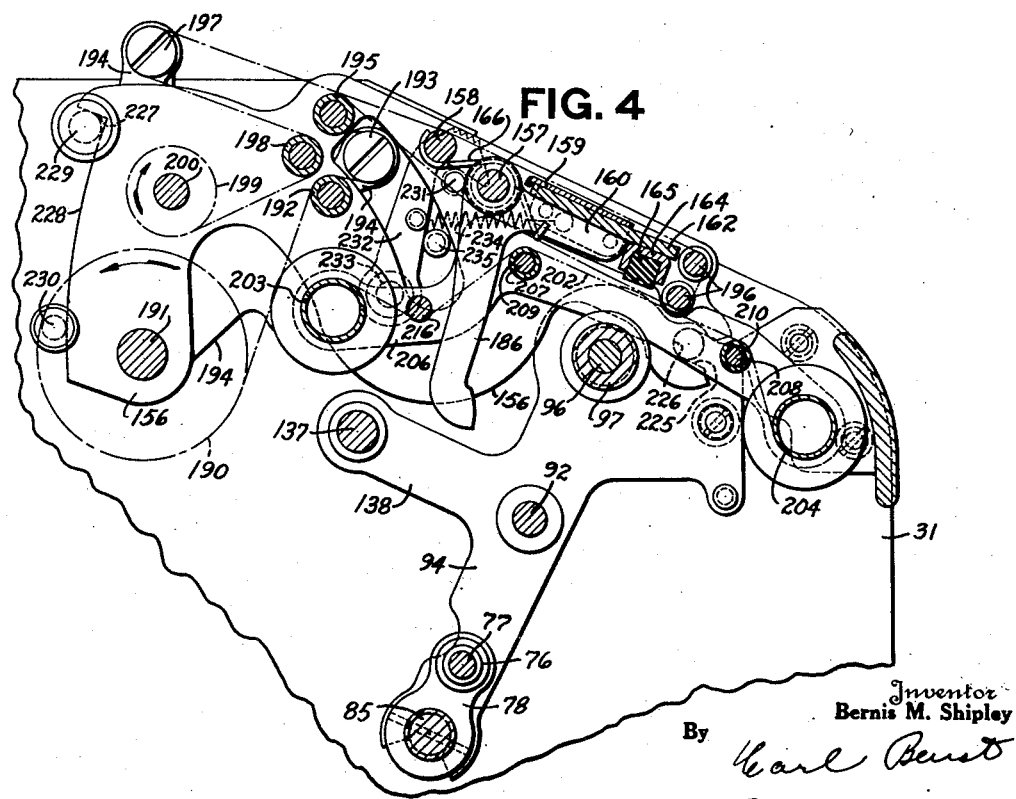
Fig. 4 is an enlarged transverse sectional view taken through the printing mechanism.

Racks 90 (Fig. 3) carried by the links 75, mesh with pinions 91 rotatably mounted on a cross rod 92, supported in spaced hangers 93 and 94 (Figs. 3, 4 and 7). The lower extended end of the hanger 94 (Fig. 4) is forked to embrace the cross rod 85, the forked end resting in a groove (Fig. 6) in the rod which prevents lateral movement. The upper end of the hanger is secured to the side frame 31, being offset therefrom by the spacer 95. The hanger 93 (Fig. 7) is supported by the cross rod 92 and a shaft 96 projecting through a hollow stud 97 secured in the hanger 94. A retaining clip 98 fits into grooves in the projecting ends of the rods 92 and 96 to hold the hanger in its position on the ends of the rods. The hangers 93 and 94 and the rod 92 and shaft 96 form a framework which supports the type wheels and their driving gears, and the consecutive number device, the whole constituting a unitary sub-assembly which is readily applied to and removed from the machine, as a whole.

The pinions 91 (Fig. 3) on the rod 92 are each secured to one side of a large gear 99 of corresponding order, meshing directly with corresponding amount type wheels 100 and a transaction type wheel 101 (Fig. 7), rotatively mounted on the hollow stud 97.

It can be seen that the type carrier controlling segments 74 through the links 75, racks 90 and pinions 91 and the gears 99, set the type wheels 100 under the influence of the particular amount key or keys 36 depressed. The amount type wheels 100 remain in the positions to which they are last set until they are again moved by depression of other keys in the same order, or restored to their zero positions in those orders wherein no keys are depressed on the succeeding operaton of the machine.

Consecutive number printer

The other group of type wheels 102 on the hollow stud 97 (Fig. 7) are the consecutive number type wheels. These type wheels are advanced step by step at each operation of the machine to count the number of operations thereof. The consecutive number wheel advancing and resetting mechanism is best shown in Figs. 6, 7 and 9, the mechanism for advancing the consecutive number type wheels being first described.

One end of an arm 103 (Fig. 6) is supported on the shaft 54 mounted in the arms of the bar 55 and is secured to a projection 104 of the key coupler 47. The opposite bifurcated end of the arm embraces a stud 110 projecting laterally from a lever 111 journaled on an elongated hub 112 of a gear 131 rotatable on the cross rod 92. As the key coupler 47 rocks up and down, as described above, due to the depression and release of the key 36, it rocks the shaft 54 and the arm 103 first clockwise and then counter-clockwise to normal. The arm 103, in turn, rocks the lever 111 first counter-clockwise and then clockwise, as viewed in Fig. 6, and vice versa, as viewed in Fig. 9. A yoke 113 connects one arm of the lever 111 with an arm 114 (Fig. 7) also journaled on the hub 112. A spring-pressed differentially tined pawl 116 (Fig. 9) pivoted on a rod 117 extending between the arm 114 and the lever 111, engages a ratchet wheel 118 journaled on the hub 112. As the lever 111 oscillates, the tined pawl 116 picks up and advances the ratchet wheel 118 one step, and is then retracted to its position behind the next succeeding ratchet tooth.

A gear 119, secured to the ratchet wheel 118, meshes with a gear 120 secured to the side of the consecutive number type wheel 102 of units order to transmit the step-by-step movement of the ratchet 118 to the type wheel. Spring-pressed detents 121 (Fig. 6) pivoted on a rod 122 in a bracket 123, secured to the hanger 93, engage the peripheries of the ratchets 118 to hold them in the positions to which they have been moved, and to prevent retrograde movement thereof when the feed pawls 116 are retracted.

The consecutive number device may be turned to zero manually by a knurled wheel 124 (Figs. 5, 6 and 7) fast on the right hand end of the shaft 96, as viewed in Fig. 7. A gear 130 (Figs. 6 and 7) mounted on the shaft 96 and caused to rotate therewith by a flattened face of the shaft co-acting with a complementary flattened wall of the gear (Fig. 6), meshes with the gear 131 fast on the hub 112 journaled on the rod 92. As viewed in Fig. 6, the knurled wheel 124, when turned clockwise, operates through the gear 130 to rotate the gear 131 and the hub 112 in counter-clockwise direction. As the hub 112 rotates, one of two identical longitudinal grooves 132 (Fig. 9) therein, picks up resetting pawls 133, one of which is pivotally supported on each of the gears 119, and which repose in their respective chambered openings 134 in the ratchet wheels 118 (Figs. 6 and 9). Continued rotation of the gear 131 and hub 112 carries the resetting pawls 133 and the gears 119 around until the type wheels 102 arrive at their zero positions. This requires one complete rotation in clockwise direction (Fig. 6) of the knurled knob 124 and one-half of a rotation of the hub 112 and of gears 119.

Type aligning

After the amount and transaction type wheels 100 and 101 are adjusted to their new positions by the depression of the keys in their respective groups, it is necessary to align the wheels while the impression is being taken therefrom. The aligning means includes an aligning comb 135 (Fig. 3), the ends of which are bent at right angles thereto to form arms 136, which are journaled on a stud 137 projecting laterally from a rearward extension 138 of the hanger 94. Only one of the arms 136 appears in the drawings, the other being directly behind and coinciding therewith. A stud 139 on an ear 140 of the arm 136 behind the one appearing in Fig. 3, projects through a cam slot 141 (Figs. 3 and 5) in a cam arm 142 of a bell crank 145 journaled on the cross rod 37. A stud 143 projects from the cam arm 142 through an open slot 144 formed by a hook 150 on an arm 151 fast on the shaft 54. It will be remembered that depression of an amount key 36 rocks the shaft 54 first clockwise and then counter-clockwise to normal. The shaft rocks the hooked arm 151 with it, which through the stud 143, rocks the bell crank 145 and the cam arm 142 first clockwise and then counter-clockwise to normal. Near the end of the clockwise stroke of the key 36 (Fig. 1) and consequently of the cam arm 142 (Figs. 3 and 5), an offset portion of the slot 141 contacts the roller 139 and rocks the ear 140 and aligner arm 136 clockwise to enter the aligner comb 135 between adjacent serrations formed around the periphery of the type wheel gears 99, to lock these gears and the connected type wheels 100 and 101 against movement while the impression is being taken.

When the depressed key or keys 36 are released by the operator, the key coupler 47 restores the aligner mechanism just described to its normal position, as shown in Fig. 3.

A shaft (not shown) extends across the machine and through a concentric slot formed in the arm 151 for clearance.

The consecutive number type wheels are normally aligned by their respective spring-pressed retaining pawls 121 (see Fig. 6).

Printing operation

Figure 11:
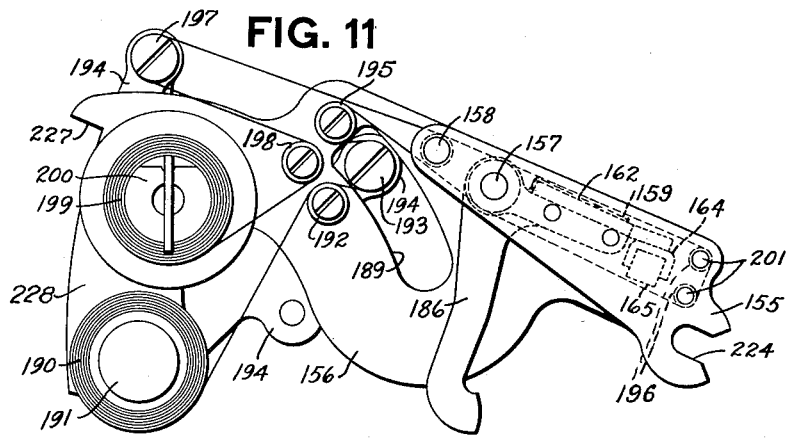
Fig. 11 is a view in left elevation showing the unit construction of the detail paper and impression frame removed from the machine.

After the type wheels 101 and 102 are adjusted and aligned, an impression arm is operated to take an impression therefrom on the detail record strip which is retained in the machine. The impression arm, the web upon which the impressions are made, the paper shifting device and the paper feeding mechanism, are all mounted on a frame work which is quickly and easily removable from the machine. This framework will be described in detail later. Generally, it includes side pieces 155 and 156 (Figs. 4 and 11), spaced apart and rigidly joined by cross rods 157 and 158, and by an autograph plate 159.

Spaced arms 160, 163 (Figs. 3, 4, 5 and 11) pivoted on the cross rod 157, carry a cross brace 162, the arm 160 having a depending arm 186, through which the arms 160 and 163 and cross brace 162 are rocked. An inverted channel bar 164 secured to the under side of the cross brace 162 carries a platen 165 adapted to be rocked into contact with the types on the type wheels 100, 101 and 102 to take the impression therefrom. A spring 166 (Fig. 4) coiled about the cross rod 157 has one end hooked under the arm 160 and its other end hooked about the adjacent cross rod 158 to normally hold the platen 165 away from the type wheels, the autograph plate 159 operating to limit the counter-clockwise travel of the platen-carrying arms 160 and 163.

To operate the impression platen 165 to take the impression from the type wheels on the detail record strip, a platen driver 167 (Figs. 3 and 5) is mounted to float on the main frame cross rod 85, that is, one end of the driver is slotted, as at 169, to loosely embrace the cross rod. A spring-pressed latch 168 pivoted at 170 on the platen driver 167, normally lies in the path of a flat stud 171 projecting from an arm 172 of the aligner-operating bell crank 145. A spring 173 holds the latch 168 yieldingly against a limiting and guide stud 174 projecting from the platen driver 167 to limit the counter-clockwise movement of the latch while permitting clockwise movement thereof. A stud 180 carried by an arm 181 journaled on the cross rod 85, projects laterally across the paths of travel of the platen driver 167, and of a finger 182 on a lever 183 pivoted on the main cross rod 37 and is urged in counter-clockwise direction by a spring 184, the stud 180, in effect, being normally clamped between the lower edge of the platen driver 167 and the finger 182 of the spring-pressed lever 183. The spring 184 presses the finger 182 of the lever 183 against the stud 180 to normally press the upper edge of the platen driver 167 against an abutment 185 projecting inwardly from the side frame 31.

It will be recalled that depression of an amount key 36 rocks the key coupler 47, shaft 54 and the hooked arm 151 clockwise to rock the bell crank 145 also clockwise, and that the counter-clockwise restoring movement of the key coupler, upon release of the depressed key, rocks the shaft 54, and the hooked arm 151 counter-clockwise to return the bell crank 145 counter-clockwise back to normal.

The bell crank 145, on its clockwise movement, presses the stud 171 on the arm 172 against the latch 168, to retract the platen driver 167. The platen driver 167, in turn, contacts the elongated stud 180 and presses the latter against the driving lever 183 to rock the lever 183 clockwise against the tension of spring 184.

The pivotal points of the platen driver 167 and of the bell crank 145 are so related, and the pivotal point 170 (of the latch 168) and the limiting stud 174 are so arranged on the platen driver, that the path of travel of the stud 171 on the bell crank 145, intersects the path of travel of the free end of the latch 168 as controlled by the limiting stud 174, at a point near the limit of clockwise travel of the bell crank arm 172. At this point, the latch 168 escapes the stud 171, whereupon the spring 184, acting through its lever 183 and the stud 180, rocks the platen driver sharply in counter-clockwise direction towards the abutment 185. It will be remembered that the platen driver has a loose floating connection with its cross rod 85. Therefore, when the platen driver 167 strikes the abutment 185, the momentum of the upper part thereof, due to the mass of material, continues to advance counter-clockwise with the abutment 185 as the fulcrum until the left hand wall of slot 169 strikes the cross rod 85. At about the time the platen driver 167 strikes the abutment 185, its head strikes the end of the arm 186 depending from the platen-supporting arm 160, thereby rocking the platen-supporting arms 160 and 163 clockwise to cause the platen 165 to impinge sharply against the type elements 100, 101 and 102, to take the impressions therefrom.

The platen driver 167, aided by the spring 166 (Fig. 4), which returns the platen-supporting arms 160 and 163 together with the platen 165 to normal, immediately rebounds to its normal position, as viewed in Fig. 5, the spring 166 at the same time raising the platen 165 to its normal position.

When the operator releases the depressed key 36, the key coupler 47 rocks the shaft 54 and its hooked arm 151 (Fig. 5) counter-clockwise, which latter, through its engagement with the stud 143, rocks the bell crank 145 counter-clockwise to its normal position. The stud 171 on the arm 172 of the bell crank 145, in its clockwise movement, cams the latch 168 aside against the tension of its spring 173, which latter immediately restores the latch to its normal position with its bill beneath the stud as soon as the stud 171 is past.

Removable paper supporting frame

The detail web is carried on the removable frame mentioned above, including the side pieces 155 and 156, (Figs. 3, 4 and 11) rigidly joined by the cross rods 157 and 158, and the autograph plate 159. The web is unwound from a supply roll 190 journaled on a stud 191 projecting from the side piece 156. The web then passes around a guide roller 192 to a shifting slack-forming roller 193 carried by one arm of a bell crank 194 located outside the space between the side pieces 155 and 156 and extending laterally through an arcuate slot 189 formed in the adjacent side piece 156.

From the shifting slack-forming roller 193, the paper strip is passed around another guide roller 195 between the side pieces 155 and 156, and thence forwardly under the cross rod 157, and around a pair of guide rollers 196 located between the forward ends of the side pieces 155 and 156, and then back over the top of the autograph plate 159 above the cross rod 158 to another shifting or slack take-up roller 197 on the other arm of the bell crank 194, from whence, it passes around another guide roller 198 to a receiving or wind-up roller 199 journaled on a stud 200 in the side piece 156. The guide rollers 192, 195 and 198 are mounted on identical studs projecting from the side piece 156. The guide rollers 196, at the forward end of the paper-supporting frame, turn on trunnions 201 projecting therefrom into suitable holes in the side pieces 155 and 156.

Suitable means to rotate the receiving roll 199 step by step and to actuate the bell crank 194 to shift the web from its normal position, in which the last impression is visible to the operator through a sight opening in the casing 34, to a position in readiness to receive the next impression, and then back to its visible position again, is provided. This feeding and shifting mechanism, however, is substantially disclosed in U. S. patent to F. L. Fuller, No. 1,394,256, dated October 18, 1921, to which reference is made for further description thereof.

Removable ink ribbon carrier

An ink ribbon is provided in the printing mechanism to enable the impression platen 165 to take the impression from the type elements on the detail paper. This ribbon 202

Figure 12:
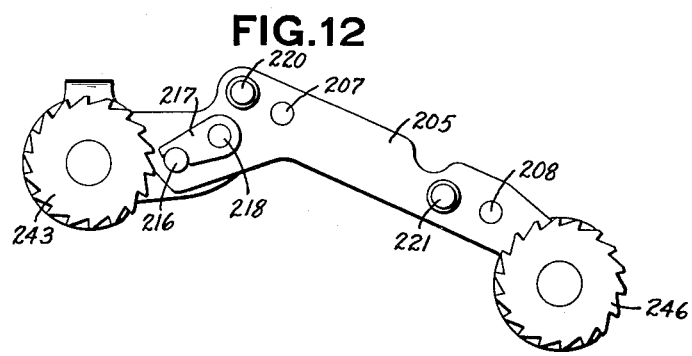
Fig. 12 is a similar view, showing the unit construction of the ink ribbon frame removed from the machine.

(Fig. 4) is wound and unwound from two spools 203 and 204 journaled at the opposite ends of a pair of side plates 205 and 206 (Fig. 12) spaced apart from and arranged parallel with each other. Studs 207 and 208 projecting inwardly from the side plate 205, extend into corresponding hollow studs 209 and 210 projecting inwardly from the opposite side plate 206, thereby forming a framework readily removable from the machine. A stud 216 (Figs. 4 and 12) projecting between the side plates 206 and 205, extends through a hole in the side plate 205, a retaining clip 217 pivoted at 218 in the side plate 205 removably entering an annular groove in the protruding end of the stud 216 to hold the side plates together. Studs 209, 210 and 216 also serve to guide the ribbon 202 as it is fed at each operation of the machine.

By rocking the retaining clip 217 (Fig. 12) clockwise out of the groove in the stud 216, the side plate 205 and its studs 207 and 208 may be separated from the side plate 206 and the studs 209, 210 and 216 therein, to permit replacement of the ribbon when required.

Figure 2:
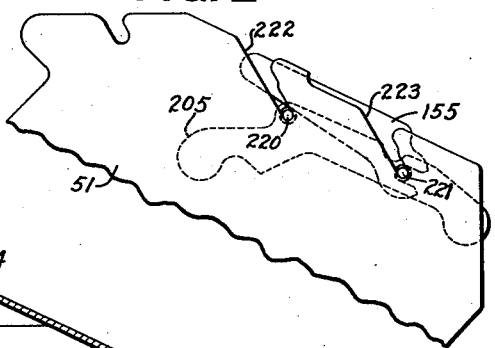
Fig. 2 is a fragmentary side view showing the method of mounting the detail paper frame and the ink ribbon frame.

To position the removable ribbon frame in the machine, it is only necessary to enter the supporting studs 220 and 221 (Figs. 2 and 12) projecting outwardly from the side plate 205, into the mouths of the open slots 222 and 223 formed in the upper edge of the intermediate frame 51, and press the ribbon frame downwardly until the studs rest on the bottoms of their respective slots, with the lower edge of the side plate 206 resting on the hollow cross stud 97 (see Fig. 4).

From the foregoing, it is seen that one side of the ribbon frame is suspended or hung upon the partition 51 by reason of the grooved studs 220 and 221 which fit and are embraced by the walls of the slots 222 and 223 in the partition 51, the slots being inclined to guide the ribbon frame to its proper position in the machine relatively to the other cooperating mechanisms, and the other side of the ribbon frame rests on the hollow stud 97.

Obviously, it is only necessary to lift the ribbon frame in order to remove it from its proper position. The supporting studs 220 and 221 are shouldered to fit their slots in the intermediate frame 51, the shoulders serving to properly space the side plate 205 away from the frame 51.

To insert the detail paper and platen frame into the machine, an open slot 224 (Figs. 3 and 11) in the front end of the side piece 155 is first placed in a substantially vertical position over the stud 221 in the side plate 205 of the ribbon frame at a point between said side plate and the partition frame 51. At the same time, a similar open slot 225 (Fig. 4) in the side piece 156 is fitted over a stud 226 projecting from the main hanger 94. The frame is now rotated counter-clockwise, as viewed in Fig. 4, about the studs 221 and 226 until a shoulder 227 (Figs. 3, 4 and 11) on the extended left hand edge 228 of the side piece 156 rests upon a stud 229 projecting from the side frame 31.

The left edge 228 of the side piece 156 is concentric with studs 225 and 226 and, as the frame is lowered into position, the concentric edge enters a groove in the stud 229 which guides the side piece 156. As the frame is lowered farther, the edge 228 enters a groove in a stud 230 also projecting from the side frame 31. The studs 229 and 230, besides guiding the side piece 156 and the entire frame as it is lowered in the machine, also serve to hold the frame firmly against any torsional strain. When the frame nears its proper position in the machine, as it is lowered thereinto, a stud 231 (Fig. 4) projecting outwardly from the side piece 156 strikes an inclined edge of a retaining hook 232 pivoted on a stud 233 on the side frame 31 and rocks said hook counter-clockwise against the action of a spring 234. As soon as the stud is past the hook, the spring 234 snaps said hook over the stud 231, thus locking both the detail paper frame and the ink ribbon frame in their proper positions in the machine. A stud 235 projecting laterally from the side frame 31 limits the clockwise movement of the retaining hook 232. The free end of the hook 232 is knurled to provide a convenient means to disengage it from the stud 231 when removing the frame from the machine.

*Ribbon feeding and reversing mechanism*

As mentioned above, means is provided to feed the ink ribbon 202 by winding it on one of the spools 203 or 204 and unwinding it from the other. Also novel means is provided to reverse the direction of the ribbon feed. This feed and reversing mechanism will now be described.

Figure 13:
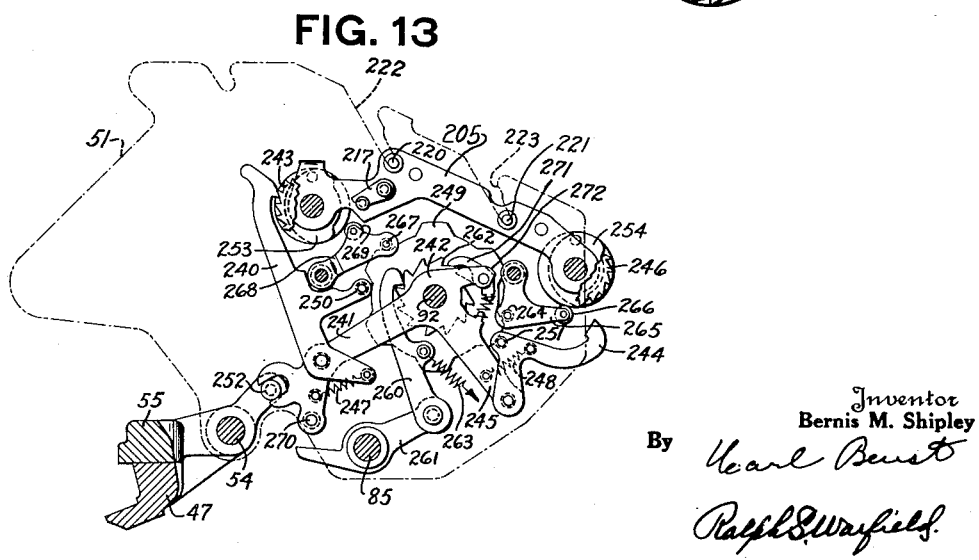
Fig. 13 is a detail view of the ink ribbon feeding and reversing mechanism.

A feed pawl 240 (Fig. 13), pivotally supported on the arm 241 of the bell crank 242 journaled on the cross rod 92, is adapted to co-operate with a ratchet 243 fast on one end of the spool 203. Another feed pawl 244 pivotally supported on the other arm 245 of the bell crank 242 is adapted to co-operate with the ratchet 246 attached to one end of spool 204. Springs 247 and 248 constantly urge pawls 240 and 244, respectively, into co-operative relation with their respective ratchets, but a control disk 249 journaled on the cross rod 92 co-operates with studs 250 and 251 on the pawls 240 and 244, respectively, and permits one only of the feed pawls to engage its ratchet at a time, the periphery of the control disk being provided with spaced nodes so arranged that one of the feed pawls is always held disengaged from its ratchet. The mechanism is shown in Fig. 13 with the pawl 240 engaged with its ratchet 243, and the pawl 244 disengaged from its ratchet 246.

In order to feed the ribbon 202, a stud 252 on one end of an arm 253 projecting from the bar 55 on the key coupler 47, extends through the bifurcated end of the arm 241 of the bell crank 242. It will be recalled that the key coupler 47 rocks first clockwise and then counter-clockwise when a key 36 is depressed and then released. This rocks the bell crank 242 first counter-clockwise to advance the ratchet 243 or 246 which, at that time, is engaged by its feed pawl and then clockwise to retract the pawl preparatory to imparting another step of movement to the ratchet on the next operation. The pawl which is disengaged from its ratchet, of course, moves idly with the bell crank 242.

The control disk 249 is intermittently rotatable step by step in counter-clockwise direction. Each advance of the control disk 249 brings a high spot where previously there was a low spot and a low spot where previously there was a high spot. It can be seen, by reference to the drawings, that when the disk 249 is rotated one step, a high spot contacts the stud 250, and forces the pawl 240 out of engagement with its ratchet 243, and at the same time, a high spot is withdrawn from the stud 251 of the pawl 244, whereupon the spring 248 rocks the pawl 244 into engagement with its ratchet 246. The next advance of the control disk 249, of course, reverses this condition, again enabling the pawl 240 to engage its ratchet 243, and disengaging the pawl 244 from its ratchet 246. The step by step advance of the control disk 249 to alternately engage and disengage pawls 240 and 241 is under the control of collapsible flanges 253 and 254 provided on the spools 203 and 204, respectively. For a detailed description of the collapsible flanges, see Letters Patent of the United States, No. 1,578,209, issued to C. F. Rosien, on March 23, 1926.

A dog 260 pivotally supported on a lever 261 journaled on the cross rod 85, engages a ratchet 262 fast on one side of the control disk 249. A spring 263 constantly urges the dog 260 downwardly to advance the ratchet 262 and the control disk 249 counter-clockwise, but is restrained by a stud 264 projecting across the plane of the control disk 249, which restraining stud is carried by an arm 265 pivoted on the intermediate frame 51.

A roller 266 on the end of the restraining arm 265 rests against the collapsible flange 246 of the spool 204 in such a manner that when the spool is full and the collapsible flange is held in its outer position to complete the circumference of the fixed flange, as disclosed in my co-pending application, Serial No. 344,362, filed March 5, 1929, the restraining stud 264 rests against the inclined edge of one of the nodes of the control disk 249 to block counter-clockwise movement of the disk. When the ribbon is all unwound from the spool 204, the flange 254 collapses, thereby depriving the restraining arm 265 of its back-stop, and enabling the spring 263 to rock the ratchet 262 and disk 249 counter-clockwise until the inclined edge of another node strikes a restraining stud 267 on an arm 268 similar to the restraining arm 265, and pivoted likewise on the intermediate frame 51 and located adjacent the remaining spool 203 which is filled.

Obviously, the inclined face of the node which contacts the restraining stud 267 on the restraining arm 268, tries to rock the arm but cannot do so because the adjacent spool 203, being full, has positioned its collapsible flange 253 closely adjacent a roll 269 on the restraining arm 268, so that, as a result, the restraining arm 268 is caused to lock the control disk against farther rotation.

On the counter-clockwise movement of bell crank 242, a stud 270 carried by the arm 241 of the bell crank, rocks the lever 261 counter-clockwise to retract the dog 260 to engage the next ratchet in readiness to advance the control disk when the next reversing movement is due, i. e., when the ribbon is all fed onto the spool 204 again. The lever 261 and dog 260 remain in this position until the ribbon is completely unwound from the spool 203.

Since the dog 260 is spring-actuated to drive the control disk 249 step by step in clockwise direction, it is possible that some condition might arise to prevent the dog 260 from imparting a full step of movement to the control disk. In such case, the ratchet 262 would not advance far enough and the dog 260, when retracted, would fail to engage the next ratchet tooth. To overcome this, a thrust pawl 271, pivotally supported on a projection 252 of the bell crank 242, is given an invariable movement coincident with the bell crank, first in counter-clockwise direction and then clockwise to normal. In case the spring 263 and its dog 260 fail to advance the control disk 249 throughout its full step of movement, the thrust pawl 271, on the first operation of the machine following the collapse of one of the ribbon spool flanges 253 or 254, to free the control disk 249 to the action of the spring 263 and dog 260, picks up the ratchet 262 and advances it to the proper position. The pawl 271 is then retracted to the position in which it appears in Fig. 13.

Obviously, so long as the dog 260 performs its work, the thrust pawl operates idly.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:—

1. In a machine of the class described, the combination with a type carrier; differential means to variously adjust the type carrier; and an impression means; of a driver therefor having a plurality of fulcrum points whereby said driver receives a definite retracting movement, a forward movement equal thereto, and an additional forward movement; manually-operable means to give the driver its definite retracting movement about one fulcrum point; means to releasably connect the driver and the manually operable means, and adapted for automatic disconnection when the driver has been sufficiently retracted; and resilient means tensioned by the driver as it is retracted to give the driver, upon its release, a forward movement about said one fulcrum point equal to its retracting movement, and an additional movement about another fulcrum point to operate the impression means.

2. In a machine of the class described, the combination with a type carrier; and means to take impressions therefrom; of a floating drive means for the impression means; means to retract the drive means and automatically effect its escape when sufficiently retracted; and means disconnected from and adapted to impel the drive means to cause it to operate the impression taking means.

3. In a machine of the class described, the combination with a type carrier; of means to take impressions from the type carrier; a driver to actuate the impression-taking means, the driver normally lying in its discharged position; normally idle means to impel the driver on its effective stroke; means to retract the driver and to render the impelling means potentially effective; transmitting means interposed between the driver and the impelling means; and an automatically releasable coupling between the driver and the retracting means.

4. In a machine of the class described, the combination with a type carrier; of means to take impressions from the type carrier; a driver to actuate the impression-taking means, the driver normally lying in discharged position; means to impel the driver on its effective stroke; and a floating transmission member interposed between the driver and the impelling means.

5. In a machine of the class described, the combination with a type carrier; of means to take impressions from the type carrier; a driver to actuate the impression-taking means, the driver normally lying in discharged position; means to impel the driver on its effective stroke; a floating transmission member interposed between the driver and the impelling means; and means operable to retract the driver, and through the interposed member, to render the impelling means potentially effective.

6. In a machine of the class described, the combination with a type carrier; of means to take impressions from the type carrier; a driver to actuate the impression-taking means, the driver normally lying in discharged position; means to impel the driver on its effective stroke; a freely shiftable support; and a member mounted in the support and extending transversely across the paths of travel of the driver and the impelling means, respectively, to enable transmission of motion from one to the other.

7. In a machine of the class described, the combination with a type carrier; of means to take impressions from the type carrier; a driver having a floating pivot, to actuate the impression-taking means; the driver normally occupying its discharged position; means to retract the driver about its floating pivot; and an abutment in the path of the effective stroke of the driver, adapted to form a fulcrum about which the driver rocks near the end of its effective stroke, relatively to its normal pivot point.

8. In a machine of the class described, the combination with a type carrier; of means to take impressions from the type carrier; a driver having a floating pivot, and a fulcrum on different centers; means to retract the driver about one of its pivotal points; and means to impel the driver to cause it to turn on the other of its pivotal points as it approaches its normal discharged position.

9. In a machine of the class described, the combination with a type carrier; of means to take impressions from the type carrier; a pair of centers offset relatively to each other; a driver having a floating connection with one of said centers and normally lying adjacent the other of said centers; means to retract the driver; and means to impel the driver on its effective stroke near the end of which it fulcrums on the last-named center to deliver its blow.

10. In a machine of the class described, the combination with a type carrier; and means to take impressions therefrom; of a suitable support; a driver loosely mounted on the support for limited lateral movement relatively thereto; means to retract the driver; means to impel the driver towards the impression-taking means; and an abutment in the path of the driver to serve as a fulcrum therefor and cause the driver to shift laterally relatively to its support.

11. In a printing mechanism, the combination with a type carrier; and means to take impressions therefrom; of a suitable support; a driver having a loose connection with the support to afford the driver a slight lateral movement in one direction; means to retract the driver and enable it to escape from its retracting means when sufficiently retracted; means to advance the driver towards the impression means; and an abutment in the path of the driver to arrest the driver in its travel about its support, such abutment constituting a fulcrum on which the driver rocks to impart its blow to the impression means and then rebound.

13. In a machine of the class described, the combination with a type carrier; of means to take impressions from the type carrier; a rockable shaft; a hooked arm on the shaft; a bell crank having a stud engaged by the hooked arm; another stud on the bell crank; a floating driver pivoted apart from the bell crank; a latch pivotally supported on the driver to cooperate with the last-named stud to enable the bell crank to retract and release the driver; and means operable upon release of the driver to impel the driver against the impression means.

13. In a machine of the class described; the combination with a type carrier; of means to take impressions from the type carrier; a shaft carrying a hooked arm; a bell crank having a stud engaged by the hooked arm; another stud on the bell crank; a floating driver pivoted apart from the bell crank; a latch pivotally mounted on the driver and adapted to cooperate with the last-named stud to retract and release the driver; means operable upon release of the driver to impel the driver against the impression means; and interposed transmission means to enable the driver to set the impelling means.

14. In a machine of the class described; the combination with a type carrier; of means removably supported in the machine to take impressions from the type carrier; including a rockable shaft; a hooked arm on the shaft; a bell crank carrying a stud engageable by the hooked arm; a second stud on the bell crank; a floating driver pivoted apart from the bell crank; a latch on the driver to releasably engage the last-named stud and enable the bell crank to retract and release the driver; means operable upon release of the driver to impel the driver against the impression means; and a floating stud interposed between the impelling means and the driver for transmitting motion of one to the other.

15. In a machine of the class described; the combination with a type carrier; and means to take impressions from the type carrier; of a suitable support; a driver having an elongated opening surrounding the support; means to retract and release the driver; means to impel the driver on its effective stroke; and an abutment adapted, when struck by the driver, to become a fulcrum for the driver to cause it to travel beyond its normal home position and actuate the impression means.

16. In a machine of the class described; the combination with a type carrier; and means to take impressions from the type carrier; of a suitable support; a driver having an elongated opening therein surrounding the support; a latch pivotally supported on the driver; an operative bell crank; a stud on the bell crank normally engaged by the latch; a lever having a spring attached to the free end thereof; a floating stud interposed between the lever and the driver to transmit motion from either to the other; means operable to rock the bell crank to retract the driver, the floating stud and the lever, and place additional tension on the spring, the paths of the latch and of the bell crank being so arranged as to enable the latch to escape the stud and free the driver to the action of the spring, and an abutment in the path of the driver, adapted to become the fulcrum therefor to cause the momentum of the driver to carry the driver beyond its normal position, and actuate the impression means.

17. In a machine of the class described; the combination with a main frame; of a ribbon frame removably supported in the machine; a second removable frame superposed thereon and carrying the detail strip and impression platen; means on the ribbon frame to support the detail strip and platen frame; and means on the main frame to latch both removable frames in the machine.

18. In a machine of the class described; the combination of a removable frame; means to support the frame in the machine; another removable frame located above the first-named removable frame; means on the first-mentioned frame to support the second frame; a stud on one of the frames; and a latch on the supporting means to cooperate with the stud to hold both frames in place.

19. In a machine of the class described having a main frame; the combination of a removable frame; studs on the removable frame cooperating with slots in the main frame to support the removable frame; a second removable frame superposed upon the first-named removable frame; means on the first-mentioned frame to support the second-mentioned removable frame; a stud on one of the removable frames; and a manually operable latch on the main frame engageable with the stud to hold both removable frames in place.

20. In a machine of the class described, the combination with a main frame; of a slotted partition plate supported between the sides of the main frame; a sub-frame; shouldered studs projecting from one side of the sub-frame and removably seating in the slots in the partition plate to removably suspend the sub-frame on the side of the partition plate; a second removable sub-frame superposed above the first-named sub-frame; the second-named sub-frame being slotted at one end to embrace studs mounted on the first-named sub-frame and on the main frame, respectively; shouldered studs on the main frame adjacent the opposite end of the second-named sub-frame; an extension formed on the second-named sub-frame adapted to engage the last-named shouldered studs; and a stop on the extension to arrest the second-named sub-frame in proper position.

In testimony whereof I affix my signature.

BERNIS M. SHIPLEY.